Patented Oct. 24, 1939

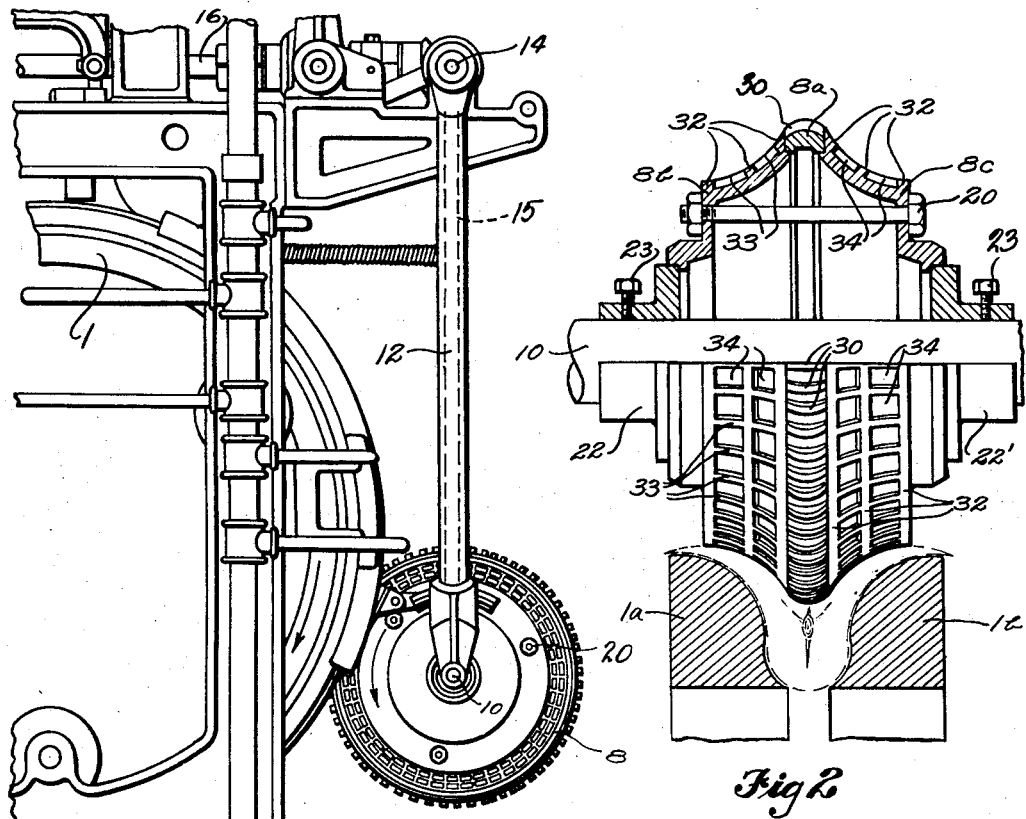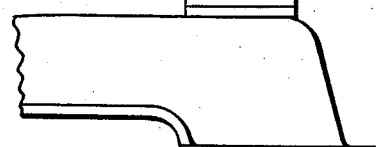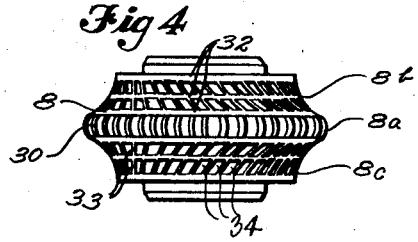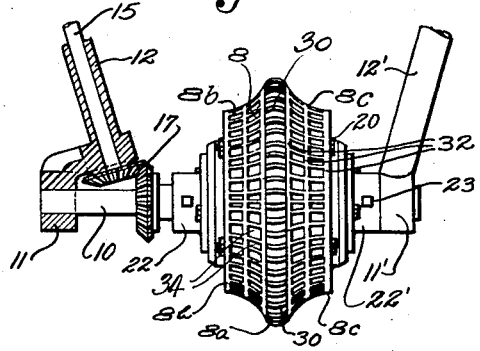

2,177,013

UNITED STATES PATENT OFFICE 2,177,013

FISH CLEANING WHEEL

Lawrence W. Zandt and Victor K. Lipp, Seattle, Wash.

Application July 2, 1937, Serial No. 151,688

2 Claims. (Cl. 17—3)

This invention relates to fish cleaning machines, and it has reference more particularly to improvements in machines of that type commonly known as the "Iron Chink" but which may be useful also in other types of machines wherein devices are arranged in combination for the mechanical butchering and cleaning of fish; it being the principal object of this invention to provide an improved rotary means in the nature of a wheel for scraping the inside walls of the abdominal cavity of fish bodies after they have been slit open and the viscera removed.

More specifically stated, the present invention resides in the details of construction of a rotatably driven wheel that is adapted to be positioned in such manner as to have peripheral contact with the prepared fish as they are advanced by the machine, and which wheel has a peripheral scraping surface of novel formation, whereby the wall surfaces of the abdominal cavity of each fish, in passing, are scraped and cleaned of all matter that may be loose or clinging thereto.

It is a further object of this invention to provide a wheel for the above stated purpose having its peripheral surface transversely shaped to conform to the transverse contour of the cavity of the opened fish and which is provided with transverse ribs of novel character for scraping the surfaces.

A still further object resides in the provision of a plurality of ribs encircling the wheel for engaging the scraped surface of the fish and whereby the scraping ribs are prevented from gouging into the surfaces.

It is another object of the invention to provide a wheel of sectional construction which provides for an easy removal of the central peripheral section for replacement when that part becomes worn.

Other objects of the invention reside in the various details of construction and in the combination of parts as will hereinafter be fully described.

In accomplishing these and other objects of the invention, we have provided the improved details of construction, the preferred forms of which are illustrated in the accompanying drawing, wherein—

Fig. 1 is a partial side view of a fish cleaning machine of a common type, in which a scraping wheel embodied by the present invention, is employed.

Fig. 2 is an enlarged view of the scraping wheel, shown partly in axial cross section and partly in elevation; and showing in dotted lines, the position of a fish body relative to the wheel while being scraped thereby.

Fig. 3 is a detail, illustrating a means for revolving the scraping wheel.

Fig. 4 is a view illustrating a wheel having scraping ribs of an alternative form of construction.

Referring more in detail to the drawing—

Briefly described, the machine as partially illustrated in Fig. 1, comprises a large wheel 1, revolubly supported to revolve about a horizontal axial line. This wheel comprises two, spaced annular portions 1a and 1b, as indicated in Fig. 2, that are shaped to provide a sort of open bottom trough extending circumferentially about the wheel. It is customary in the use of the machine, that the fish to be cleaned be delivered to the wheel with heads and tails cut off. In their delivery, the tail portion of each fish enters first and is projected between the spaced rings 1a and 1b and are held by suitable means, such as pins that are projected thereinto from opposite sides, and whereby, incident to rotation of the wheel, the fish will be caused to be laid lengthwise, and back down, within the circumferential trough. During the rotation of the wheel and travel of the fish across the top arc of the wheel, or prior thereto, revolving knives, not here shown, cut off the belly, and back fins, and a slitter opens up the belly for removal of the viscera by fixed scrapers or other suitable means which lay the fish open with the opposite sides thereof laying against the side walls of the trough portion of the wheel. Ultimately each fish will reach the location of the present scraping wheel 8 and the interior of the abdominal cavity is then cleaned out by the peripheral surface of the wheel operating in scraping contact therewith.

The wheel 8, as here shown, is of substantial width and is fixed axially on a driving shaft 10. This shaft is revoluble in bearings 11—11', located at opposite sides of the wheel, and suspended by shafts 12—12' from a pivot shaft 14 mounted horizontally in the frame structure of the machine, as seen in Fig. 1. The wheel 8 is rotated by a driven shaft 15 which is contained in the tubular suspending shaft 12 and is provided at its upper end with a bevel geared connection of suitable kind, with a shaft 16. This latter shaft is connected with the machine driving means which also rotates the large wheel 1. At its lower end, shaft 15 has a geared connection, as at 17 in Fig. 3, with the shaft 10. The drive is such that the scraping surface of the wheel at the place of contact with the fish, rotates toward the direction of travel of the fish, as indicated in Fig. 1 by the arrows located on the parts.

In their general use, wheels of this kind are approximately fifteen inches in diameter and nine inches across their peripheral scraping surface, but these dimensions may vary. As shown best in Fig. 2, the wheel 8 comprises a central, annular section 8a to which are fitted opposite side sections 8b and 8c.

All sections are joined tightly together by a plurality of bolts 20 which extend through the wheel from side to side. As seen in Fig. 2, the opposite side portions of the wheel are constructed to axially mount hub portions 22—22' through which the driving shaft 10 is extended. Set screws 23 threaded through the hubs hold the parts in place.

The features of this invention reside in the details of the wheel 8, and it will be observed best by reference to Fig. 2, that the central annular section is formed about its outer edge with transverse, closely spaced and outwardly bowed ribs 30 with recesses of substantial depth between them. The opposite side sections of the wheel present peripheral surfaces of substantial widths that curve inwardly and away from the central plane of the section 8a, thereby providing scraping surfaces which in transverse section conform to the opened fish bodies as presented thereto on the wheel 1.

Each of the opposite side sections of wheel 8 is formed with encircling ribs 32, in planes perpendicular to the wheel axis, and spaced apart as shown best in Fig. 2. Between these encircling ribs are cross ribs 33, which define recesses or pockets 34 of substantial depth in the wheel surface.

In Fig. 4 is illustrated an alternative construction in which the scraping ribs 33 are inclined angularly with reference to the direction of travel of the wheel surface and are not directly across as in Fig. 2.

In both types of wheels, the outer surfaces of the encircling ribs are flat and even with the top surfaces of the cross ribs, and the cross ribs have square corners so as to provide a thorough scraping effect on the fish. The encircling ribs hold the surfaces down and prevent the cross ribs gouging or scraping too deeply.

Assuming the wheel 8 to be so constructed, it is quite apparent that as the wheel 1 rotates, and fish are presented for scraping to the wheel 8, it will enter the abdominal cavity and its cross ribs will operate to scrape loose and clean the wall surfaces of the cavity of all loose flesh or tissues that otherwise would cling. The shape of the wheel causes it to operate effectively on all surfaces and particularly along the spinal portion. The encircling ribs hold the flesh down so that it will not be gouged into by the cross ribs, and the cavity will be effectively cleaned.

Wheels of this kind may vary in size, shape and details of assembly, and may be used in various kinds of machines.

Having thus described our invention, what we claim as new therein and desire to secure by Letters Patent is:

1. A fish scraping wheel having a central peripheral portion provided with transverse ribs for scraping the spinal line of the cavity of the fish, and having opposite side portions of lesser diameter than the central peripheral portion curved to conform to the opposite side walls of the fish and having scraping ribs transversely thereon and having other ribs encircling the wheel and spaced in a direction transversely of the wheel and of a height even with the height of the transverse ribs of the said side portions.

2. A fish scraping wheel having a central peripheral portion formed with transversely directed, outwardly curved ribs for scraping the spinal line of the cavity of the fish and having opposite side portions of lesser diameter than the said central peripheral portion and formed with ribs spaced from the central portion and encircling the wheel to engage the side walls of the fish being scraped, to limit the depth of the scraping by the transversely directed ribs.

LAWRENCE W. ZANDT.
VICTOR K. LIPP.